(12) United States Patent
Schoeberl et al.

(10) Patent No.: US 9,190,717 B2
(45) Date of Patent: Nov. 17, 2015

(54) RADAR SENSOR

(75) Inventors: Thomas Schoeberl, Hildesheim (DE);
Reinhard Meschenmoser, Hannover (DE); Arne Zender, Bad Salzdetfurth (DE); Thomas Hansen, Hildesheim (DE); Joerg Hilsebecher, Hildesheim (DE); Karl Nesemann, Lohfelden (DE); Oliver Lange, Hannover (DE)

(73) Assignee: ROBERT BOSCH GMBH, Stuttgart (DE)

( * ) Notice: Subject to any disclaimer, the term of this patent is extended or adjusted under 35 U.S.C. 154(b) by 272 days.

(21) Appl. No.: 13/519,567

(22) PCT Filed: Dec. 14, 2010

(86) PCT No.: PCT/EP2010/069578
§ 371 (c)(1),
(2), (4) Date: Oct. 4, 2012

(87) PCT Pub. No.: WO2011/098173
PCT Pub. Date: Aug. 18, 2011

(65) Prior Publication Data
US 2013/0016001 A1 Jan. 17, 2013

(30) Foreign Application Priority Data
Feb. 10, 2010 (DE) .................... 10 2010 001 761

(51) Int. Cl.
*G01S 7/35* (2006.01)
*G01S 13/34* (2006.01)
(Continued)

(52) U.S. Cl.
CPC ............... *H01Q 1/3233* (2013.01); *G01S 7/03* (2013.01); *G01S 13/343* (2013.01); *G01S 13/426* (2013.01);
(Continued)

(58) Field of Classification Search
CPC ............... G01S 7/02; G01S 7/03; G01S 7/28; G01S 7/282; G01S 7/285; G01S 7/35; G01S 7/352; G01S 13/02; G01S 13/06; G01S 13/42; G01S 13/426; G01S 13/08; G01S 13/32; G01S 13/34; G01S 13/343; G01S 13/88; G01S 13/93; G01S 13/931; G01S 2013/9321; H01Q 1/27; H01Q 1/32; H01Q 1/3208; H01Q 1/3233; H01Q 3/22; H01Q 21/0006; H01Q 21/0037; H01Q 21/06; H01Q 21/08; H01Q 25/00

USPC ......... 342/27, 28, 59, 70–72, 73, 74, 81, 118, 342/128–145, 175, 192–197, 350, 368, 375, 342/374; 367/87, 99, 103; 343/700 R, 731, 343/753, 754, 757, 763, 765, 767, 768, 770, 343/772, 776, 778, 850, 853

See application file for complete search history.

(56) References Cited

U.S. PATENT DOCUMENTS 2,810,905 A 10/1957 Barlow
3,179,937 A * 4/1965 Abbott ........................ 342/375
(Continued)

FOREIGN PATENT DOCUMENTS

CN 101609931 12/2009
DE 102006032540 1/2008
(Continued)

OTHER PUBLICATIONS

Merrill L. Skolnik, "Introduction to Radar Systems"; McGraw-Hill Book Company; New York, New York, USA; Second Edition, 1980; ISBN 0-07-057909-1; p. 75, Figure 3.4.*

(Continued)

*Primary Examiner* — Bernarr Gregory
(74) *Attorney, Agent, or Firm* — Kenyon & Kenyon LLP

(57) ABSTRACT

A radar sensor including an antenna array having multiple antenna elements situated next to one another and at least one feeding point at an outer antenna element. The antenna elements are connected in series via delay lines. The radar sensor has at least two transmitting and receiving units which are each suitable for generating and evaluating a radar signal at a predefined frequency. The at least two transmitting and receiving units are connected to a feeding point of the antenna array. The frequencies of the radar signals of the at least two transmitting and receiving units are predefinable independently of one another.

19 Claims, 4 Drawing Sheets

(51) Int. Cl.

| | | |
|---|---|---|
| *G01S 13/93* | (2006.01) | |
| *H01Q 1/32* | (2006.01) | |
| *G01S 7/03* | (2006.01) | |
| *G01S 13/42* | (2006.01) | |
| *H01Q 3/22* | (2006.01) | |
| *H01Q 21/08* | (2006.01) | |
| *H01Q 25/00* | (2006.01) | |
| *G01S 13/00* | (2006.01) | |

(52) U.S. Cl.
CPC .............. *G01S 13/931* (2013.01); *H01Q 3/22* (2013.01); *H01Q 21/08* (2013.01); *H01Q 25/00* (2013.01); *G01S 2013/9321* (2013.01)

(56) References Cited

U.S. PATENT DOCUMENTS

| | | | | |
|---|---|---|---|---|
| 3,274,601 A | * | 9/1966 | Blass | 343/754 |
| 3,400,405 A | * | 9/1968 | Patterson, Jr. | 342/374 |
| 3,419,870 A | * | 12/1968 | Wong | 343/768 |
| 3,434,139 A | * | 3/1969 | Algeo | 343/778 |
| 3,480,961 A | * | 11/1969 | Copeland et al. | 343/765 |
| 4,119,971 A | * | 10/1978 | Stark | 343/768 |
| 4,234,940 A | * | 11/1980 | Iinuma | 342/375 |
| 4,276,551 A | * | 6/1981 | Williams et al. | 342/375 |
| 4,403,220 A | * | 9/1983 | Donovan | 342/59 |
| 4,864,308 A | | 9/1989 | Raab et al. | |
| 4,868,574 A | | 9/1989 | Raab | |
| 5,063,390 A | * | 11/1991 | Konig | 342/375 |
| 5,150,336 A | * | 9/1992 | Sullivan et al. | 367/103 |
| 5,563,602 A | * | 10/1996 | Stove | 342/70 |
| 6,266,011 B1 | * | 7/2001 | Hong | 342/375 |
| H2028 H | * | 6/2002 | Koscica et al. | 343/731 |
| 6,806,845 B2 | * | 10/2004 | Fund et al. | 343/853 |
| 7,061,443 B2 | * | 6/2006 | Lee et al. | 343/770 |
| 7,791,530 B2 | * | 9/2010 | Puglia | 342/128 |
| 2009/0303108 A1 | | 12/2009 | Hilsebecher et al. | |

FOREIGN PATENT DOCUMENTS

| | | |
|---|---|---|
| JP | 11-308046 | 11/1999 |
| JP | 2001-7640 | 1/2001 |
| JP | 2008-51560 | 3/2008 |
| JP | 2008-261794 | 10/2008 |
| JP | 2008-541085 | 11/2008 |
| JP | 2009-152657 | 7/2009 |

OTHER PUBLICATIONS

International Search Report, PCT International Application No. PCT/EP2010/069578, dated Feb. 24, 2011.

Hammer, I., "Frequency-Scanned Arrays," *Radar Handbook*, Merrill I. Skolnik, McGraw-Hill, New York, (Chapter 13) Jan. 1, 1970.

Mayer, W. et al., "A Novel Direct-Imaging Radar Sensor with Frequency Scanned Antenna," *2003 IEEE MTT-S International Microwave Symposium Digest*, New York, NY, vol. 3, No. 8, pp. 1941-1944(Jun. 8, 2003).

Van Caekenberghe, K. et al., "A 94 GHz OFDM Frequency Scanning Radar for Autonomous Landing Guidance," *Radar Conference*, pp. 248-253, (Apr. 17, 2007).

* cited by examiner

RADAR SENSOR

FIELD OF THE INVENTION

The present invention relates to a radar sensor having an antenna array including multiple antenna elements situated next to one another and at least one feeding point on an outer antenna element. The antenna elements are connected in series via delay lines.

BACKGROUND INFORMATION

Radar sensors are increasingly used in motor vehicles to determine distances and relative speeds with respect to preceding vehicles. They make distance warnings and adaptive cruise control (ACC) possible.

Such antenna arrays, which are also referred to as phased-array antennas, have significant directivity and thus allow the creation of angle-resolved radar sensors. The delay lines cause phase shifts between the waves emitted by the individual series-connected antenna elements. The antenna arrays are designed in such a way that constructive and destructive interference of the emitted waves results in a lobe-shaped directional characteristic of the radar field emitted by the antenna array at the radar frequency used by the radar sensor, e.g., in the range of 76 gigahertz (GHz). The formed directional lobe is able to be swiveled by varying the transmitting and receiving frequency.

Information regarding preceding vehicles may thus be acquired in an angle-resolved manner via frequency variation. The area in front of a motor vehicle may be scanned in a corresponding angle-resolved manner. However, the scanning times are long due to the swiveling of the directional lobes over the entire viewing angle. In addition, the surroundings are scanned at a particular instant at only a single swiveling angle corresponding to the width of the directional lobe.

A radar sensor including multiple independent antennas is described in German Patent Application No. DE 10 2006 032 540 A1. The antennas are situated offset in relation to an optical axis of a shared radar lens. Each individual antenna has a predefined directional characteristic, the antennas covering different angular ranges due to the configuration of the individual antennas and the shared radar lens. Simultaneous angle-resolved scanning of different angular ranges is possible in this manner, the radar sensor being configured in a mechanically complicated manner due to the use of independent antennas and the radar lens and the angular ranges not being able to be readily changed.

SUMMARY

It is an object of the present invention to provide an angle-resolving radar sensor that makes it possible using a simple mechanical design to scan multiple angular ranges at the same time and to be able to swivel the scanned angular ranges in a simple manner.

In accordance with the present invention, an example radar sensor may include an antenna array having multiple antenna elements situated next to one another and connected in series via delay lines has at least two transmitting and receiving units suitable for generating and evaluating a radar signal at a predefined frequency. The at least two transmitting and receiving units are connected to a feeding point of the antenna array. The frequencies of the radar signals of the at least two transmitting and receiving units are predefinable independently of one another.

As a result of the configuration of the antenna array having antenna elements situated next to one another and delay lines situated between them, each of the radar signals of a transmitting and receiving unit causes the emission of a targeted radar field. The direction is determined by the frequency of the radar signal of the particular transmitting and receiving unit. In total, the superposition of the individual signals of each transmitting and receiving unit 20 results in a radar field composed of the superposition of at least two targeted radar fields. As a result, at least two—or also more in the case of multiple transmitting and receiving units—angular ranges may be scanned at the same time. The angular ranges may also be swiveled in a simple manner by varying the frequencies. The embodiment of the antenna array as a phased-array antenna also allows a simple mechanical design.

BRIEF DESCRIPTION OF THE DRAWINGS

The present invention is explained in greater detail below on the basis of exemplary embodiments with the help of the figures.

DETAILED DESCRIPTION OF EXAMPLE EMBODIMENTS

Figure 1:
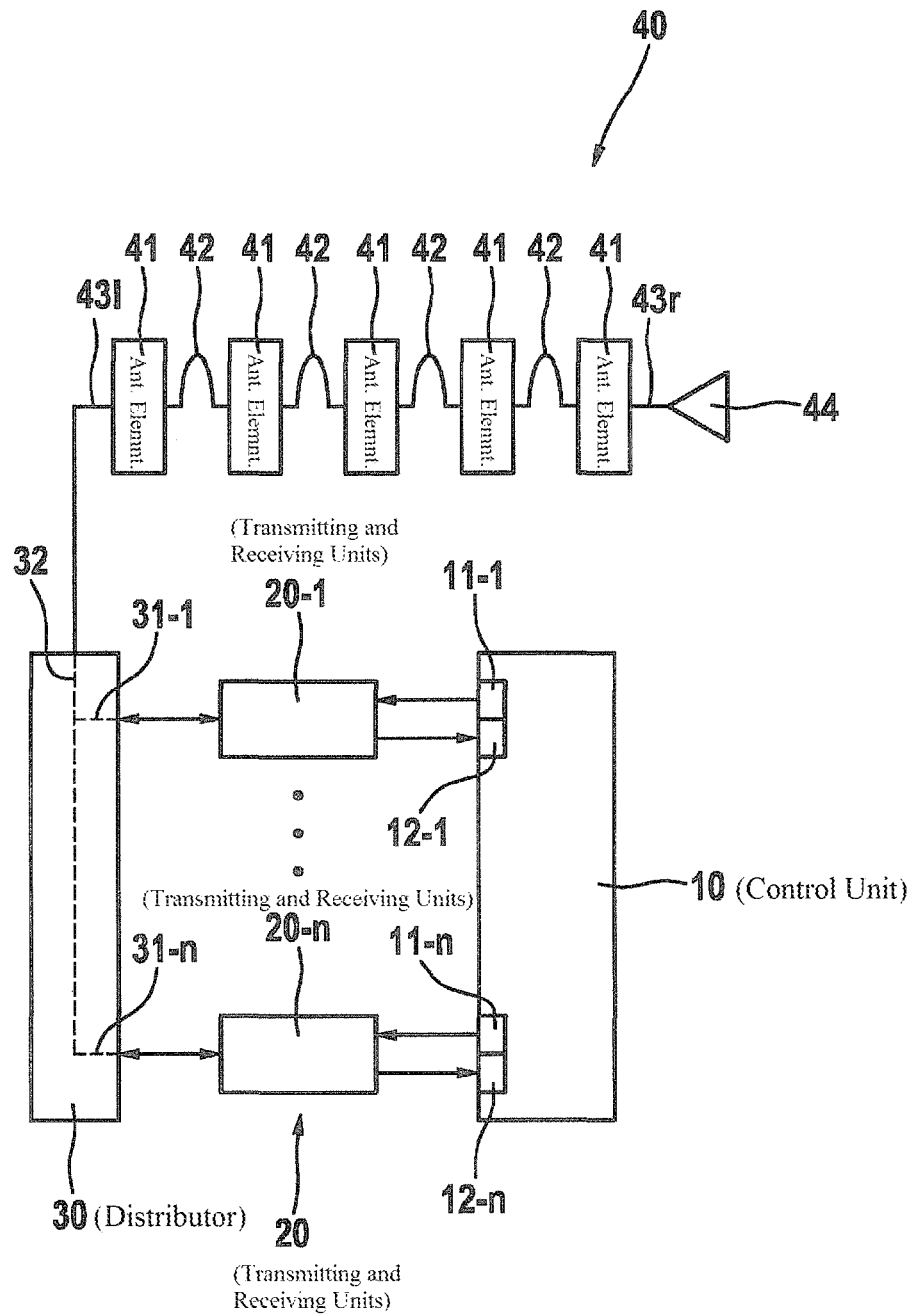
FIG. 1 shows a first exemplary embodiment of a radar sensor having a control unit.

FIG. 1 schematically shows a radar system having a radar sensor and a control unit.

The radar system has a control unit 10 and a radar sensor including multiple transmitting and receiving units 20, a distributor 30, and an antenna array 40. Control unit 10 has control outputs 11 and intermediate frequency signal inputs 12 via which control unit 10 is connected to transmitting and receiving units 20. Each of transmitting and receiving units 20 is then connected to a high frequency input and output 31 of distributor 30. Distributor 30 also has an antenna connection 32 for connecting to antenna array 40. Antenna array 40 includes multiple antenna elements 41 situated next to one another, adjacent antenna elements 41 being connected to one another via a delay line 42. The outer two antenna elements 41 of the linear, chain-like array formed in this way are connected to feeding points 43*l* and 43*r*, of which one, feeding point 43*l*, contacts antenna connection 32 of distributor 30 and the other, feeding point 43*r*, is terminated by terminator 44.

A plurality n of transmitting and receiving units 20 is provided for the radar sensor in the radar system according to FIG. 1. For the purpose of clarity, only two transmitting and receiving units 20-1 and 20-*n* are shown as examples. According to number n of transmitting and receiving units 20, control unit 10 has a number n of pairs of control outputs 11 and intermediate frequency signal inputs 12 and distributor 30 has a number n of HF inputs and outputs 31. Via individual control outputs 11-1 through 11-*n*, the frequency of each transmitting and receiving unit 20-1 through 20-*n* may be set independently of one another by control unit 10. Via distributor 30, the high frequency radar signals generated by transmitting and receiving units 20 are fed into antenna array 40.

As a result of the configuration of antenna array 40 as a phased array having delay lines 42, each of the high frequency signals of a transmitting and receiving unit 20 causes the emission of a radar signal having a certain emission direction depending on the frequency of particular transmitting and receiving unit 20.

In total, the superposition of the individual signals of one of each transmitting and receiving unit 20 results in a radar field composed of the superposition of n emission lobes. Each of transmitting and receiving units 20 is also designed for receiving radar signals at their own transmission frequency. In the case of an appropriate frequency selection in the receiving circuit of transmitting and receiving units 20, antenna array 40 has the same directional characteristic for transmission and reception of signals. This results in an additional increase in the angle sensitivity of the individual signals.

Antenna elements 41 of antenna array 40 may be planar elements, for example, which are situated vertically next to one another, transversely, preferably perpendicularly, to the direction of travel of the vehicle so that the directional lobes point forward parallel to the road surface. The directional lobes are swiveled on the plane spanned by the surface normal of planar antenna elements 41 and the direction in which antenna elements 41 are situated next to one another. Thus, it is possible to swivel on a horizontal plane to the left and right with respect to the oncoming lane of traffic or the edge of the road.

So-called Wilkinson high frequency distributors may be used as distributors 30. Any HF summation and divider circuit may basically be used as long as it functions as linearly as possible so that no additional possibly interfering frequency bands are introduced into the radar system by non-linear effects.

Figure 2:
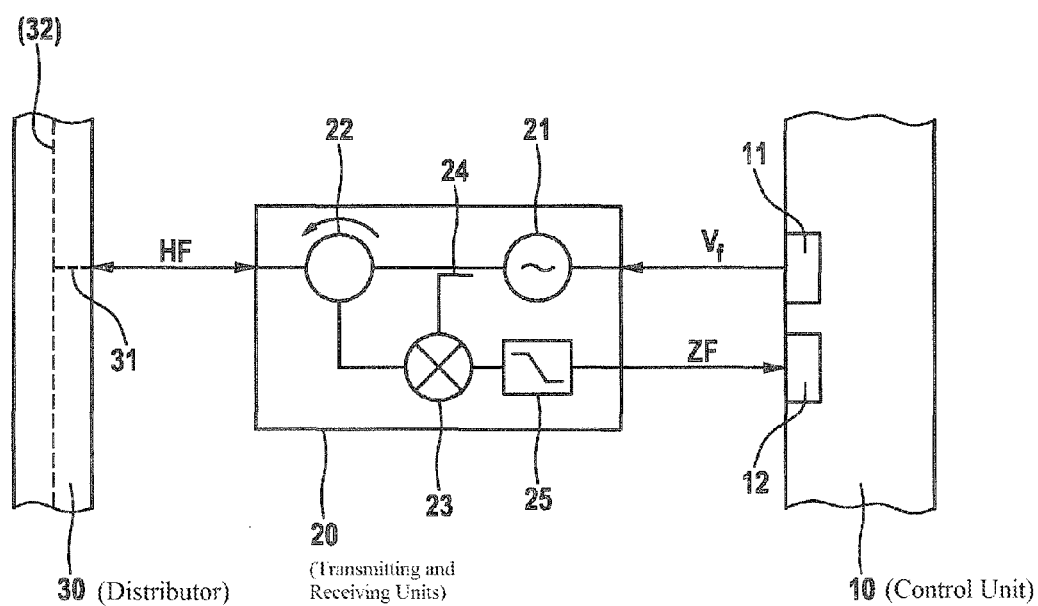
FIG. 2 shows a transmitting and receiving unit for use in a radar sensor.

FIG. 2 shows a design of a transmitting and receiving unit 20 suitable for the exemplary embodiment of FIG. 1 in greater detail. Reference numerals in all figures indicate identical or identically functioning elements.

Transmitting and receiving unit 20 has a generator 21 for generating an HF signal. Frequency f of the HF signal may be varied via a control signal $V_f$. Signal $V_f$ determining the frequency is provided by control output 11 of control unit 10 as an analog or digital signal. Transmitting and receiving unit 20 also has a circulator 22, which relays the HF signal of HF generator 21 via an output to HF input and output 31 of distributor 30, from which the signal is supplied to antenna array 40 (not shown here).

An HF signal reflected by an object and received and returned via antenna array 40 and distributor 30 is supplied via the same terminal to circulator 22, which relays it to a mixer 23. In mixer 23, the received HF signal is mixed with the HF signal generated by generator 21, picked off at a pickoff 24 and supplied to the mixer. The resulting mixed signal includes a signal at a lower frequency than the high frequency which includes information about the relative speed of the reflecting object via the Doppler shift. The mixed signal is relayed via a low-pass filter 25, which suppresses any higher frequency signals, as an intermediate frequency signal to intermediate frequency signal input 12 of control unit 10.

High frequency signal components in the mixed signal may be caused, for example, by reflected transmission signals of other transmitting and receiving units 20 emitting at another frequency than the considered transmitting and receiving unit 20. The (low) frequency filtering in the mixed signal corresponds to a frequency selection in the HF signal path of transmitting and receiving unit 20. An HF selectivity of transmitting and receiving unit 20 resulting in a directional characteristic also for received signals is achieved in this manner.

Figure 3:
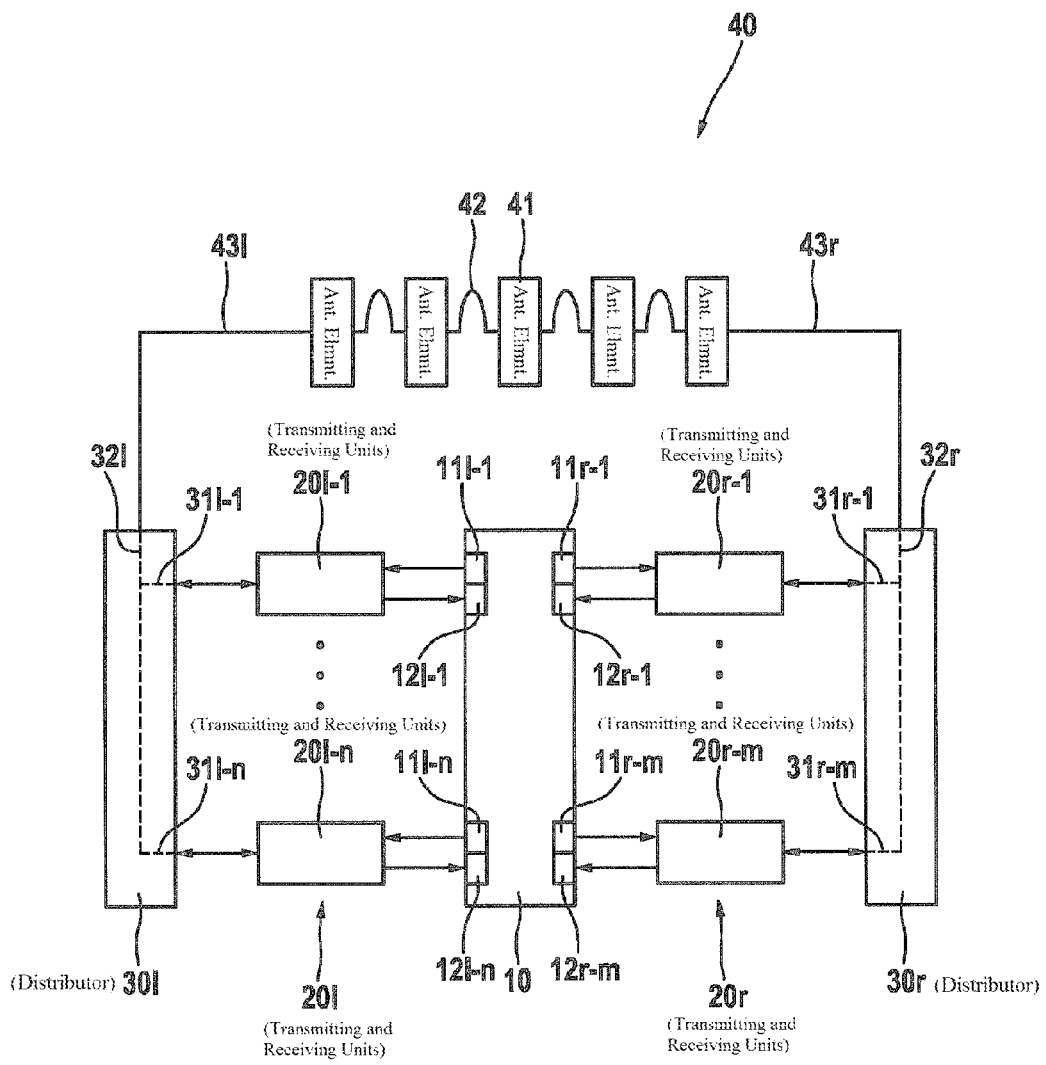
FIG. 3 shows a second exemplary embodiment of a radar sensor having a control unit.

FIG. 3 shows a second exemplary embodiment of a radar system having a control unit and a radar sensor.

The design is analogous to that of the exemplary embodiment shown in FIG. 1. In contrast to the radar sensor from FIG. 1, feeding point 43r of antenna array 40 in the exemplary embodiment in FIG. 3 is not terminated by a terminator but is connected to an additional distributor 30 which also allows the connection of transmitting and receiving units 20. To differentiate distributors 30 used in this exemplary embodiment and transmitting and receiving units 20 connected to these distributors 30, indices l (left) and r (right) are used, all elements provided with index l acting on left feeding point 43l and all elements provided with index r acting on right feeding point 43r.

The exemplary embodiment in FIG. 3 provides a number of n transmitting and receiving units 20l-1 through 20l-n and a number m of transmitting and receiving units 20r-1 through 20r-m. Distributors 30l and 30r have a corresponding number of HF inputs and outputs 31l-1 through 31l-n and 31r-1 through 31r-m. The same is true for control outputs 11 and intermediate frequency inputs 12 of control unit 10. A system as shown in FIG. 3 may have advantages in particular when the total number n+m of provided transmitting and receiving units 20 is large and an individual distributor 30 having a corresponding number of HF inputs and outputs 31 would exhibit attenuation that is too high. However, the fundamental operating principle of the system in FIG. 1 and FIG. 3 does not differ. In particular, the transmitting and receiving units described in greater detail in FIG. 2 may also be used as transmitting and receiving units 20l and 20r in the exemplary embodiment in FIG. 3.

The operating principle of a radar sensor having multiple transmitting and receiving units 20 is explained in the following in connection with FIGS. 4 and 5. A radar sensor as specified in the exemplary embodiment of FIG. 3 in which two transmitting and receiving units 20l and 20r are operated at both distributors 30l and 30r (n=m=2) is taken as an exemplary basis.

Figure 4:
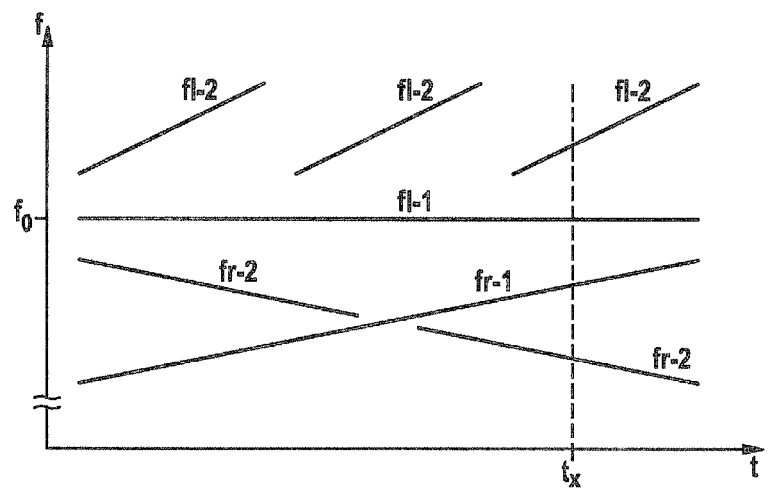
FIG. 4 shows a diagram of the time dependence of transmitting and receiving frequencies in a radar sensor.

FIG. 4 is a schematic diagram showing frequency f of emitted HF signals of the transmitting and receiving units as a function of time t in an exemplary embodiment of a radar sensor. Frequencies f of transmitting and receiving units 20l-1, 20l-2, 20r-1, 20r-2 are referred to as fl-1, fl-2, fr-1, and fr-2. Frequency $f_0$ marked on the frequency axis refers to the frequency at which antenna array 40 emits in a direction perpendicular to the direction in which antenna elements 41 are situated. This direction is referred to as the basic direction in the following.

As shown in FIG. 4, transmitting and receiving unit 20l-1 is operated at a constant frequency fl-1 equal to $f_0$ while the remaining transmitting and receiving units 20l-2, 20r-1, and 20r-2 are operated at frequencies that change linearly in sections. The frequency changes in the presented example are periodic as shown by the sawtooth-like curve of frequency fl-2. The period length may be selected differently for different transmitting and receiving units 20. It is also possible that one or more of the frequencies may be changed as a function of a detected object, for example, to keep it in the observation area (object tracking).

Figure 5:
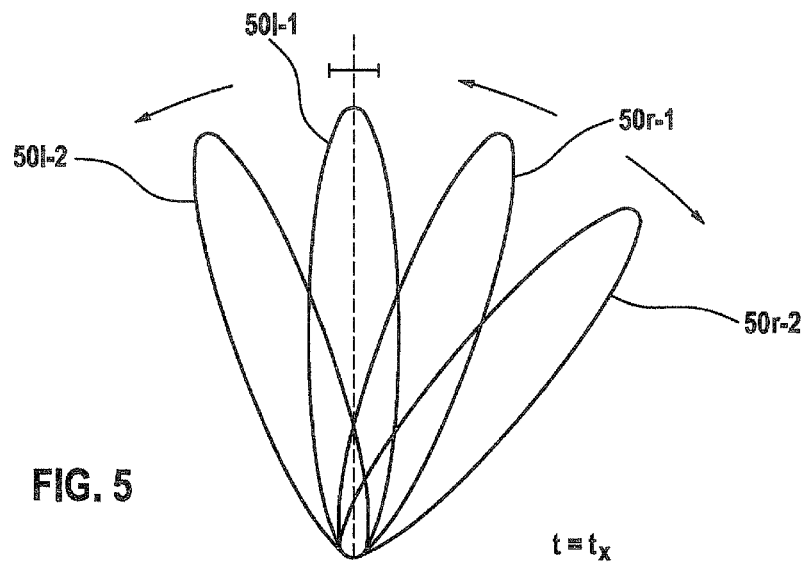
FIG. 5 shows a diagram of the emission characteristic of a radar sensor.

FIG. 5 shows the entire directional characteristic of the radar sensor resulting from the superposition of the four directional lobes 50 assigned to the four transmitting and receiving units 20 as a snapshot at a point in time $t=t_x$ shown as a dashed line in FIG. 4. The arrows at the ends of directional lobes 50 in FIG. 5 symbolize the instantaneous direction of movement of directional lobes 50. A frequency that is less than frequency $f_0$ results in a directional lobe swiveled to the right of the basic direction, while a frequency that is greater than $f_0$ results in a directional lobe that is swiveled to the left.

At point in time $t=t_x$, the displayed total directional characteristic consequently results as the superposition of directional lobe 50l-1, whose main beam direction is aligned along the basic direction and does not change over time, of directional lobe 50l-2, which is swiveled to the left and moves further in this direction, of directional lobe 50r-1, which is swiveled slightly to the right and moves to the left, and of directional lobe 50r-2, which is swiveled to the right and moves further in this direction. With the shown system, an angular range aligned in a centrally forward direction, i.e., in the direction of travel, may be advantageously continuously observed via directional lobe 50l-1 and at the same time oncoming traffic is scanned via movable directional lobe 50l-2, and the edge of the road is scanned via additional movable directional lobes 50r-1 and 50r-2. The simultaneous scanning allows continuous observation of relevant angular ranges with simultaneously good angle resolution.

In the case of radar systems having a constant frequency and continuous, non-pulsed emission, a signal reflected by an object initially only includes information regarding the speed of the reflecting object. Information regarding the signal propagation time, which may be acquired, for example, on the basis of pulsed radar signals, is required to ascertain distance information. In the case of continuously emitting radar systems, period information may be acquired via frequency modulation (FMCW—frequency modulated continuous wave). In the case of angle-resolved radar sensors presented as part of this Application, a periodic frequency change used for angle variation may be used at the same time to acquire distance information from the reflected radar signal. For this purpose, it is necessary to evaluate the received radar signal over at least two periods of the frequency change.

Alternatively, it is possible to superpose an additional, e.g., ramp-shaped or sawtooth-shaped, frequency modulation on the frequency-varied signal for angle variation. Such modulation may have a smaller frequency deviation than the frequency variation for angle variation and a shorter period length.

Alternatively, the example radar sensors may also be used as a pulse radar. In such a case, several radar pulses at the same transmission frequency may be emitted, for example, resulting in the transmission frequency changing incrementally for the purpose of changing the angle.

In the exemplary embodiments, further processing of the signals received at intermediate frequency signal inputs 12 of control unit 10 may advantageously be performed via an analog-digital converter and subsequent frequency analysis, e.g., via Fast Fourier Transform (FFT).

Control unit 10 is not part of the radar sensor in the above exemplary embodiments. However, it may also be designed as an integral part of the radar sensor.

In addition to presented transmitting and receiving units 20, which map the high frequency signal directly to an intermediate frequency signal via mixer 23, the use of superhet receivers that additionally use mapping to an additional intermediate frequency stage is also possible.

What is claimed is:

1. A radar sensor, comprising:
   an antenna array including multiple antenna elements situated next to one another and connected in series via delay lines, and at least one feeding point at an outer one of the antenna elements; and
   at least two transmitting and receiving units, each to generate and evaluate a radar signal at a predefined frequency, the at least two transmitting and receiving units being connected to the at least one feeding point of the antenna array, and the predefinable frequency of the radar signal of the at least two transmitting and receiving units being predefinable independently of one another, wherein each of the transmitting and receiving units has a high frequency generator to generate the radar signal and a received radar signal is mixed with the signal generated by the high frequency generator for an evaluation of the radar signal;
   wherein the at least two transmitting and receiving units are permanently connected to the antenna array via a distributor, wherein the distributor is a Wilkinson high frequency distributor, and wherein the delay lines are configured so that a radar signal emitted by the antenna array is directed, a main beam direction depending on a frequency of the radar signal.

2. The radar sensor as recited in claim 1, wherein the distributor is a hybrid high frequency distributor.

3. The radar sensor as recited in claim 1, wherein the antenna array has two feeding points, all transmitting and receiving units being connected to a first one of the feeding points and the other of the feeding points being terminated by a terminator.

4. The radar sensor as recited in claim 1, wherein the antenna array has two feeding points and two distributors, a first one of the two distributors being connected to one of the feeding points and to at least one of the transmitting and receiving units.

5. The radar sensor as recited in claim 1, wherein the transmitting and receiving units are configured for FMCW operation.

6. The radar sensor as recited in claim 5, wherein the radar signals are frequency modulated by at least one of the transmitting and receiving units at least one of to change a main beam direction, and for distance determination.

7. The radar sensor as recited in claim 6, wherein the frequency modulation is one of a ramp-shaped or sawtooth-shaped modulation to change the main beam direction and distance determination.

8. The radar sensor as recited in claim 6, wherein the frequency modulation is composed of a first and a second one of ramp-shaped or sawtooth-shaped modulation that differs with respect to at least one of frequency deviation and period length.

9. The radar sensor as recited in claim 1, wherein the radar sensor is a Doppler radar.

10. The radar sensor as recited in claim 1, wherein the radar sensor is a pulse radar.

11. The radar sensor as recited in claim 1, wherein the antenna array has two feeding points, all transmitting and receiving units being connected to a first one of the feeding points and the other of the feeding points being terminated by a terminator.

12. The radar sensor as recited in claim 1, wherein the antenna array has two feeding points and two distributors, a first one of the two distributors being connected to one of the feeding points and to at least one of the transmitting and receiving units.

13. The radar sensor as recited in claim 1, wherein the at least two transmitting and receiving units are permanently connected to the antenna array via a distributor, wherein the distributor is a hybrid high frequency distributor, and wherein the delay lines are configured in such a way that a radar signal emitted by the antenna array is directed, a main beam direction depending on a frequency of the radar signal.

14. The radar sensor as recited in claim 13, wherein the antenna array has two feeding points, all transmitting and receiving units being connected to a first one of the feeding points and the other of the feeding points being terminated by a terminator.

15. The radar sensor as recited in claim 13, wherein the antenna array has two feeding points and two distributors, a first one of the two distributors being connected to one of the feeding points and to at least one of the transmitting and receiving units.

16. The radar sensor as recited in claim 13, wherein the transmitting and receiving units are configured for FMCW operation, wherein the radar signals are frequency modulated by at least one of the transmitting and receiving units at least one of to change a main beam direction, and for distance determination, and wherein the frequency modulation is one of a ramp-shaped or sawtooth-shaped modulation to change the main beam direction and distance determination.

17. The radar sensor as recited in claim 13, wherein the transmitting and receiving units are configured for FMCW operation, wherein the radar signals are frequency modulated by at least one of the transmitting and receiving units at least one of to change a main beam direction, and for distance determination, and wherein the frequency modulation is composed of a first and a second one of ramp-shaped or sawtooth-shaped modulation that differs with respect to at least one of frequency deviation and period length.

18. The radar sensor as recited in claim 1, wherein the transmitting and receiving units are configured for FMCW operation, wherein the radar signals are frequency modulated by at least one of the transmitting and receiving units at least one of to change a main beam direction, and for distance determination, and wherein the frequency modulation is one of a ramp-shaped or sawtooth-shaped modulation to change the main beam direction and distance determination.

19. The radar sensor as recited in claim 1, wherein the transmitting and receiving units are configured for FMCW operation, wherein the radar signals are frequency modulated by at least one of the transmitting and receiving units at least one of to change a main beam direction, and for distance determination, and wherein the frequency modulation is composed of a first and a second one of ramp-shaped or sawtooth-shaped modulation that differs with respect to at least one of frequency deviation and period length.

\* \* \* \* \*